(12) United States Patent
Rosenoff et al.

(10) Patent No.: US 8,001,457 B2
(45) Date of Patent: *Aug. 16, 2011

(54) SYSTEM, METHOD, AND SOFTWARE FOR INSERTING HYPERLINKS INTO DOCUMENTS

(75) Inventors: Douglas T. Rosenoff, Burnsville, MN (US); Anthony Mario Medina, Bainbridge Island, WA (US); Craig Runde, Winston-Salem, NC (US)

(73) Assignee: West Services, Inc., Eagan, MN (US)

( * ) Notice: Subject to any disclaimer, the term of this patent is extended or adjusted under 35 U.S.C. 154(b) by 857 days.

This patent is subject to a terminal disclaimer.

(21) Appl. No.: 11/275,946

(22) Filed: Feb. 6, 2006

(65) Prior Publication Data

US 2007/0016848 A1    Jan. 18, 2007

Related U.S. Application Data

(63) Continuation of application No. 09/237,219, filed on Jan. 25, 1999, now Pat. No. 7,003,719.

(51) Int. Cl.
G06F 17/00 (2006.01)
G06F 17/30 (2006.01)
(52) U.S. Cl. ... 715/205; 715/234; 715/256; 707/999.03; 707/E17.013
(58) Field of Classification Search ........... 715/200, 715/205, 207, 208, 209, 229, 234, 243, 246, 715/247, 251, 253, 254, 255, 256, 257, 273; 707/1–4, 6, 100, 102, 200
See application file for complete search history.

(56) References Cited

U.S. PATENT DOCUMENTS

| | | |
|---|---|---|
| 3,872,448 A | 3/1975 | Mitchell, Jr. |
| 4,384,288 A | 5/1983 | Walton |
| 4,575,621 A | 3/1986 | Dreifus |
| 4,817,050 A | 3/1989 | Komatsu et al. |
| 4,864,501 A | 9/1989 | Kucera et al. |
| 4,878,175 A | 10/1989 | Norden-Paul et al. |
| 4,887,212 A | 12/1989 | Zamora et al. |
| 4,893,270 A | 1/1990 | Beck et al. |
| 4,958,283 A | 9/1990 | Tawara et al. |
| 4,994,966 A | 2/1991 | Hutchins |

(Continued)

FOREIGN PATENT DOCUMENTS

EP        0848337        6/1996

(Continued)

OTHER PUBLICATIONS

Greenleaf et al., "The AustLII Papers—New Directions in Law via the Internet", The Journal of Information, Law and Technology, 67 pages, Jun. 30, 1997.*

(Continued)

*Primary Examiner* — Maikhanh Nguyen
(74) *Attorney, Agent, or Firm* — Edwards Angell Palmer & Dodge LLP (57) ABSTRACT

Software that automatically locates and marks specific portions of a document and defines hyperlinks including at least a portion of the marked text. An exemplary implementation, tailored for legal citations, processes the portion of the marked text as a search term, and allows completion of hyperlinks without the necessity of including complete file addresses. This implementation also defines a portion of the hyperlinks based on the cost or time of executing the hyperlink, to reduce the cost or time of executing the hyperlink.

8 Claims, 4 Drawing Sheets

U.S. PATENT DOCUMENTS

| | | |
|---|---|---|
| 5,065,315 A | 11/1991 | Garcia |
| 5,146,439 A | 9/1992 | Jachmann et al. |
| 5,157,783 A | 10/1992 | Anderson et al. |
| 5,204,947 A | 4/1993 | Bernstein et al. |
| 5,218,697 A | 6/1993 | Chung |
| 5,233,513 A | 8/1993 | Doyle |
| 5,253,362 A | 10/1993 | Nolan et al. |
| 5,265,065 A | 11/1993 | Turtle |
| 5,283,884 A | 2/1994 | Menon et al. |
| 5,291,399 A | 3/1994 | Chaco |
| 5,297,249 A | 3/1994 | Bernstein et al. |
| 5,317,729 A | 5/1994 | Mukherjee et al. |
| 5,319,711 A | 6/1994 | Servi |
| 5,361,202 A | 11/1994 | Doue |
| 5,361,346 A | 11/1994 | Panesar et al. |
| 5,377,323 A | 12/1994 | Vasudevan |
| 5,404,435 A | 4/1995 | Rosenbaum |
| 5,408,655 A | 4/1995 | Oren et al. |
| 5,414,838 A | 5/1995 | Kolton et al. |
| 5,418,942 A | 5/1995 | Krawchuk et al. |
| 5,418,948 A * | 5/1995 | Turtle ............................ 707/700 |
| 5,434,932 A | 7/1995 | Scott |
| 5,434,974 A | 7/1995 | Loucks et al. |
| 5,438,655 A | 8/1995 | Richichi et al. |
| 5,459,860 A | 10/1995 | Burnett et al. |
| 5,488,725 A | 1/1996 | Turtle et al. |
| 5,490,250 A | 2/1996 | Reschke et al. |
| 5,497,317 A | 3/1996 | Hawkins et al. |
| 5,506,984 A | 4/1996 | Miller |
| 5,515,534 A | 5/1996 | Chuah et al. |
| 5,530,852 A | 6/1996 | Meske, Jr. et al. |
| 5,535,372 A | 7/1996 | Benhase et al. |
| 5,541,583 A | 7/1996 | Mandelbaum |
| 5,544,352 A | 8/1996 | Egger |
| 5,557,539 A | 9/1996 | Fitch |
| 5,558,638 A | 9/1996 | Evers et al. |
| 5,560,005 A | 9/1996 | Hoover et al. |
| 5,581,460 A | 12/1996 | Kotake et al. |
| 5,603,025 A | 2/1997 | Tabb et al. |
| 5,608,900 A | 3/1997 | Dockter et al. |
| 5,617,565 A | 4/1997 | Augenbraun et al. |
| 5,629,981 A | 5/1997 | Nerlikar |
| 5,644,720 A | 7/1997 | Boll et al. |
| 5,646,416 A | 7/1997 | Van de Velde |
| 5,659,676 A | 8/1997 | Redpath |
| 5,708,825 A | 1/1998 | Sotomayor |
| 5,724,595 A | 3/1998 | Gentner et al. |
| 5,724,608 A | 3/1998 | Tohara |
| 5,740,252 A | 4/1998 | Minor et al. |
| 5,740,430 A | 4/1998 | Rosenberg et al. |
| 5,740,549 A | 4/1998 | Reilly et al. |
| 5,742,181 A | 4/1998 | Rush |
| 5,745,360 A | 4/1998 | Leone et al. |
| 5,745,908 A | 4/1998 | Anderson et al. |
| 5,751,961 A | 5/1998 | Smyk |
| 5,754,857 A | 5/1998 | Gadol |
| 5,761,436 A | 6/1998 | Nielsen |
| 5,764,906 A | 6/1998 | Edelstein et al. |
| 5,764,916 A | 6/1998 | Busey et al. |
| 5,781,900 A | 7/1998 | Shoji et al. |
| 5,794,050 A | 8/1998 | Dahlgren et al. |
| 5,794,236 A * | 8/1998 | Mehrle ............................ 707/5 |
| 5,794,257 A * | 8/1998 | Liu et al. ...................... 715/205 |
| 5,806,079 A | 9/1998 | Rivette et al. |
| 5,815,830 A | 9/1998 | Anthony |
| 5,819,092 A | 10/1998 | Ferguson et al. |
| 5,819,273 A | 10/1998 | Vora et al. |
| 5,822,539 A | 10/1998 | van Hoff |
| 5,822,720 A | 10/1998 | Bookman et al. |
| 5,842,224 A | 11/1998 | Fenner |
| 5,855,015 A * | 12/1998 | Shoham ...................... 715/205 |
| 5,860,073 A | 1/1999 | Ferrel et al. |
| 5,860,136 A | 1/1999 | Fenner |
| 5,862,325 A | 1/1999 | Reed et al. |
| 5,867,562 A | 2/1999 | Scherer |
| 5,867,821 A | 2/1999 | Ballantyne et al. |
| 5,873,077 A | 2/1999 | Kanoh et al. |
| 5,875,446 A | 2/1999 | Brown et al. |
| 5,878,421 A | 3/1999 | Ferrel et al. |
| 5,884,302 A | 3/1999 | Ho |
| 5,895,461 A | 4/1999 | De La Huerga et al. |
| 5,903,889 A | 5/1999 | De La Huerga |
| 5,905,866 A | 5/1999 | Nakabayashi et al. |
| 5,905,991 A | 5/1999 | Reynolds |
| 5,926,811 A * | 7/1999 | Miller et al. .................. 707/748 |
| 5,940,843 A | 8/1999 | Zucknovich et al. |
| 5,942,986 A | 8/1999 | Shabot et al. |
| 5,946,682 A | 8/1999 | Wolfe |
| 5,963,205 A | 10/1999 | Sotomayor |
| 5,963,950 A | 10/1999 | Nielsen et al. |
| 5,970,505 A | 10/1999 | Ebrahim |
| 5,974,413 A | 10/1999 | Beauregard et al. |
| 5,987,454 A | 11/1999 | Hobbs |
| 5,987,475 A | 11/1999 | Murai |
| 6,014,662 A | 1/2000 | Moran et al. |
| 6,014,677 A | 1/2000 | Hayashi et al. |
| 6,025,844 A | 2/2000 | Parsons |
| 6,026,388 A | 2/2000 | Liddy et al. |
| 6,031,537 A | 2/2000 | Hugh |
| 6,038,573 A | 3/2000 | Parks |
| 6,038,574 A * | 3/2000 | Pitkow et al. ................. 715/210 |
| 6,091,412 A | 7/2000 | Simonoff et al. |
| 6,092,074 A | 7/2000 | Rodkin et al. |
| 6,094,649 A | 7/2000 | Brown et al. |
| 6,098,081 A | 8/2000 | Heidorn et al. |
| 6,122,647 A | 9/2000 | Horowitz et al. |
| 6,128,635 A | 10/2000 | Ikeno |
| 6,141,663 A | 10/2000 | Hunkins et al. |
| 6,151,624 A | 11/2000 | Teare et al. |
| 6,178,434 B1 | 1/2001 | Saitoh |
| 6,188,751 B1 | 2/2001 | Scherer |
| 6,216,141 B1 | 4/2001 | Straub et al. |
| 6,233,591 B1 | 5/2001 | Sherman et al. |
| 6,256,631 B1 | 7/2001 | Malcolm |
| 6,263,121 B1 | 7/2001 | Melen et al. |
| 6,263,351 B1 | 7/2001 | Wolfe |
| 6,272,505 B1 | 8/2001 | De La Huerga |
| 6,289,342 B1 * | 9/2001 | Lawrence et al. ................ 707/7 |
| 6,295,542 B1 * | 9/2001 | Corbin .......................... 715/205 |
| 6,308,171 B1 | 10/2001 | De La Huerga |
| 6,345,268 B1 | 2/2002 | De La Huerga |
| 6,356,922 B1 | 3/2002 | Schilit et al. |
| 6,434,567 B1 | 8/2002 | De La Huerga |
| 6,457,028 B1 * | 9/2002 | Pitkow et al. ................. 715/206 |
| 6,507,837 B1 | 1/2003 | De La Huerga |
| 6,516,321 B1 | 2/2003 | De La Huerga |
| 6,529,911 B1 * | 3/2003 | Mielenhausen ............... 707/100 |
| 6,668,255 B2 * | 12/2003 | Mielenhausen ............... 707/100 |
| 7,333,966 B2 | 2/2008 | Dozier |
| 2002/0174105 A1 | 11/2002 | De La Huerga |
| 2003/0041305 A1 | 2/2003 | Schnelle et al. |
| 2008/0301074 A1 | 12/2008 | Dozier et al. |

FOREIGN PATENT DOCUMENTS

| | | |
|---|---|---|
| EP | 0817099 | 1/1998 |
| EP | 0848337 A1 * | 6/1998 |
| GB | 2154344 | 9/1985 |
| JP | 04-317172 | 9/1992 |
| WO | WO-96/18959 A1 | 6/1996 |
| WO | WO 97/12334 A1 * | 9/1996 |
| WO | WO-01/33432 A1 | 5/2001 |
| WO | WO-01/35714 A2 | 5/2001 |

OTHER PUBLICATIONS

A. Piacente, "Part One: Introduction to Computer-Assisted Legal Research", Computer-Assisted Legal Research Unplugged: The User-Friendly Guide to Lexis-Nexis & Westlaw, Oct. 1997, pp. 9-76.*

A. Piacente, "Part Three: Performing a Text Search "to Get a Foothoid"", Computer-Assisted Legal Research Unlugged: The User-Friendly Guide to Lexis-Nexis & Westlaw, Oct. 1997, pp. 166-318.*

A. Piacente, "Part Five: Researching Statutory Authority", Computer-Assisted Legal Research Unlugged: The User-Friendly Guide to Lexis-Nexis & Westlaw, Oct. 1997, pp. 413-456.*

U.S. Appl. No. 11/960,054, Preliminary Amendment filed Aug. 15, 2008, 8 pgs.

U.S. Appl. No. 11/960,054, Preliminary Amendment filed Dec. 19, 2007, 3 pgs.

"Examiner's First Report for Australian Patent Application No. 2004237857", (Jun. 9, 2006),3 pgs.

"Examiner's First Report for Australian Patent Application No. 27402/00", (Mar. 10, 2003),2 pgs.

"Final Office Action", U.S. Appl. No. 10/171,170, filed Jun. 13, 2002, (Feb. 15, 2006),13 pgs.

"Final Office Action", U.S. Appl. No. 09/237,219, filed Jan. 25, 1999, (Apr. 9, 2003),18 pgs.

"Final Office Action", U.S. Appl. No. 09/237,219, filed Jan. 25, 1999, (May 23, 2002), 14 pgs.

"Final Office Action", U.S. Appl. No. 09/237,219, filed Jan. 25, 1999, (May 5, 2005), 22 pgs.

"International Search Report for corresponding PCT Application No. PCT/US00/02053", (Oct. 30, 2000),7 pgs.

"Non-Final Office Action", U.S. Appl. No. 09/237,219, filed Jan. 25, 1999, (Sep. 19, 2002),13 pgs.

"Non-Final Office Action", U.S. Appl. No. 09/237,219, filed Jan. 25, 1999, (Jun. 15, 2004),24 pgs.

"Non-Final Office Action", U.S. Appl. No. 10/171,170, filed Jun. 13, 2002, (May 19, 2005),20 pgs.

"Written Opinion for corresponding PCT Application No. PCT/US00/02053", (Mar. 8, 2001),14 pgs.

Greenleaf, G., et al., "The AustLII Papers—New Directions in Law via the Internet", *The Journal of Information, Law and Technology*, <http://elj.warwick.au.uk/jilt/leginfo/97_2gree/>, (1997), 67 pgs.

Greenleaf, G., et al., "The DataLex Legal Index Workstation: Integrating Tools for Lawyers", *International Conference on Artificial Intelligence and Law*, (1991), 219-240.

"User Generated Hypertext Links", *IBM Technical Disclosure Bulletin, IBM Corp.* NY, 36(10), (Oct. 1993), 453-454.

Anonymous, "Multimedia Hyperlinks Automatically Created for Reference Documents", *Research Disclosure, GB, Industrial Opportunities Ltd.,* Havant No. 350, XP000372954, (Jun. 1993), p. 368.

Arents, H. C., "Using SGML on the Web", *Contribution to the SGML BeLux '95 Conference*, Retrieved from the Internet: <URL: http://www.mtm.kuleuven.ac.be/hca/papers/SGML95Conference.html>, (Oct. 1995), 8 pgs.

Benson, D., et al., "Multimedia Data Management for Process Control", *International Conference on Multimedia Computing and Systems*, Boston, Mass,(1994), 332-341.

Berners-Lee, T. , et al., "RFC1738, Uniform Resource Locators (URL)", Retrieved from the Internet: <URL: http://www.cis.ohio-state.edu/htbin/rfc/rfc1738.html>, (Dec. 1994), pp. 1-24.

Brill, E., "Transformation-Based Error-Driven Learning and Natural Laguage Processing: A Case Study in Part of Speech Tagging", *Association for Computational Linguistics*, 21(4), (1995), 1-37.

Bush, V., "As We May Think", *The Atlantic Monthly*, vol. CLXXVI, A Magazine of Literature, Science, Art and Politics, (1945), 101-108.

Chignell, M. H., et al., "The Hefti Model of Text to Hypertext Conversion", *Hypermedia*, vol. 3, No. 3, XP000920503, (1991), 187-205.

Dingsoyr, T., "Bayesian Networks", [online]. [retrieved Feb. 26, 1998]. Retrieved from the Internet: <URL: http://www.idi.ntnu.no/~dingsoyr/dimpoma/node18.html>,3 pages.

Dozier, C., "Assigning Belief Scores to Names in Queries", *Proceedings of the First International Conference on Human Language Technology Research*, CA, http://acl.ldc.upenn.edu/h/ho1/ho1-1008.pdf, (Mar. 18, 2001), 1-5.

Dozier, C., et al., "Automatic Extraction and Linking of Person Names in Legal Text", *Proceedings of RIAO 2000: Content Based Multimedia Information Access*, Paris, France, (Apr. 2000), 1305-1321.

Garret, L N., et al., "Intermedia: Issues, Strategies, and Tactics in the Design of a Hypermedia Document System", *Institute for Research in Information and Scholarship (IRIS)*, Brown University, Box 1946, Providence, RI 02912, 163-174.

Golovchinsky, G., "What the Query Told the Link: The Integration of Hypertext and Information Retrieval", *ACM Conf. on Hypertext*, US, NY, ACM vol. Conf. 8, XP002116578, (1997), 67-74.

Hsu, L. H., et al., "A Multimedia Authoring-in-the-Large Environment to Support Complex Product Documentation", *Multimedia Tools and Applications 8,,* Kluwer Academic Publishers, Netherlands,(1999), 11-64.

Ingham, David , et al., "Fixing the "Broken-Link" problem: the W3Objects approach", *Computer Networks and ISDN Systems*, 28, North Holland Publishing, Amsterdam, NL, (1996), 1225-1268.

Liu, P., et al., "Towards Automating the Creation of Hypermedia Service Manuals by Compiling Specifications", *International Conference on Multimedia Computing and Systems*, Boston, Mass,(1994), 203-212.

Neidermayer, D., "An Introduction to Bayesian Networks and their Contemporary Applications", Retrieved from the Internet: <URL: http://www.gpfn.sk.ca/~daryle/papers/bayesian_networks/bayes.html>, (Dec. 1, 1998), 14 pgs.

Page, C. R., "The Nuffield Interactive Book System", *Education and Training Technology Int'l*, 28(4), (Nov. 1991), 334-340.

Powell, T. A., et al., "URL Formulas", *HTML Programmer's Reference*, Osborne/McGraw-Hill, (1998), 364-367.

Rhodes, B. J., et al., "A Continuously Running Automated Information Retrieval System", *The Proceedings of the First International Conference on the Practical Application of Intelligent Agents and Multi Agent Technology*, (1996),487-495.

Rhodes, B. J., "Building a Contextually Aware Associative Memory", *Proceedings of the International Conference on Intelligent User Interfaces (IUI '00)*, (2000), 219-224.

Wilson, E., "Integrated Information Retrieval for Law in a Hypertext Environment.", *Proceedings of the 11th Annual International ACM SIGIR Conference on Research and Development in Information Retrieval* (1988), 663-677.

Zhang, Nevin L., et al., "Exploiting Causal Independence in Bayesian Network Inference", Retrieved from the Internet: <URL: http://www.cs.ubc.ca/spider/poole/papers/ZhangPoole96/ZhangPoole96.html>, (Dec. 6, 1996), 2 pgs.

"U.S. Appl. No. 09/237,219, Final Office Action mailed Apr. 9, 2003", 17 pgs.

"U.S. Appl. No. 09/237,219, Final Office Action mailed May 5, 2005", 20 pgs.

"U.S. Appl. No. 09/237,219, Final Office Action mailed May 23, 2002", 13 pgs.

"U.S. Appl. No. 09/237,219, Non Final Office Action mailed Jun. 15, 2004", 16 pgs.

"U.S. Appl. No. 09/237,219, Non Final Office Action mailed Sep. 19, 2002", 11 pgs.

"U.S. Appl. No. 09/237,219, Notice of Allowance mailed Aug. 23, 2005", 9 pgs.

"U.S. Appl. No. 09/237,219, Notice of Non-Compliance with Restriction Requirement mailed Mar. 2, 2004", 2 pgs.

"U.S. Appl. No. 09/237,219, PTO Response to Rule 312 Communication mailed Dec. 6, 2005", 2 pgs.

"U.S. Appl. No. 09/237,219, Response filed Jan. 21, 2003 to Non Final Office Action mailed Sep. 19, 2002", 11 pgs.

"U.S. Appl. No. 09/237,219, Response filed Feb. 25, 2002 to Office Action mailed Oct. 24, 2001", 44 pgs.

"U.S. Appl. No. 09/237,219, Response filed Apr. 2, 2004 to Notice of Non-Compliance with Restriction Requirement mailed Mar. 2, 2004", 3 pgs.

"U.S. Appl. No. 09/237,219, Response filed Aug. 5, 2005 to Final Office Action mailed May 5, 2005", 8 pgs.

"U.S. Appl. No. 09/237,219, Response filed Aug. 23, 2002 to Final Office Action mailed May 23, 2002", 12 pgs.

"U.S. Appl. No. 09/237,219, Response filed Oct. 25, 2005 to Notice of Allowance mailed Aug. 23, 2005", 7 pgs.

"U.S. Appl. No. 09/237,219, Response filed Dec. 15, 2004 to Non Final Office Action mailed Jun. 15, 2004", 15 pgs.

"U.S. Appl. No. 09/237,219, Response filed Dec. 19, 2003 to Restriction Requirement mailed Nov. 19, 2003", 13 pgs.

"U.S. Appl. No. 09/237,219, Restriction Requirement mailed Nov. 19, 2003", 5 pgs.

"U.S. Appl. No. 09/237,219, Restriction Requirement Received Oct. 11, 2001", 5 pgs.

"U.S. Appl. No. 10/171,170, Notice of Allowance Mailed Sep. 27, 2007", NOAR, 4 pgs.

"U.S. Appl. No. 10/171,170, Final Office Action mailed Feb. 15, 2006", 12 pgs.

"U.S. Appl. No. 10/171,170, Final Office Action mailed Jul. 17, 2007", 11 pgs.

"U.S. Appl. No. 10/171,170, Non Final Office Action mailed May 19, 2005", 15 pgs.

"U.S. Appl. No. 10/171,170, Notice of Allowance mailed Sep. 27, 2007", 4 pgs.

"U.S. Appl. No. 10/171,170, Pre-Appeal Brief Request filed Aug. 15, 2006", 4 pgs.

"U.S. Appl. No. 10/171,170, Preliminary Amendment filed Apr. 24, 2007", 13 pgs.

"U.S. Appl. No. 10/171,170, Response filed Sep. 17, 2007 to Final Office Action mailed Jul. 17, 2007", 8 pgs.

"U.S. Appl. No. 10/171,170, Response filed Oct. 19, 2005 to Non Final Office Action mailed May 19, 2005", 14 pgs.

"U.S. Appl. No. 10/171,170, Response mailed Nov. 24, 2006 to Pre-Appeal Brief Request filed Aug. 15, 2006", 2 pgs.

"U.S. Appl. No. 10/171,170 Final Office Action mailed Jul. 17, 2007", FOAR, 12 pgs.

"U.S. Appl. No. 2008201112, First Examination Report mailed on Oct. 29, 2008", 2 pgs.

"International Application Serial No. PCT/US00/02053, International Preliminary Examination Report mailed May 25, 2001", 24 pgs.

"International Application Serial No. PCT/US00/02053, International Search Report mailed Oct. 30, 2000", 10 pgs.

"International Application Serial No. PCT/US00/02053, Response filed May 8, 2001 to Written Opinion mailed Oct. 30, 2000", 23 pgs.

"International Application Serial No. PCT/US00/02053, Written Opinion mailed Mar. 8, 2001", 14 pgs.

Anonymous, "Multimedia Hyperlinks Automatically Created for Reference Documents", *Research Disclosures*, No. 350, (Jun. 1993), p. 368.

European Application No. 00905771.2, Office Action Mailed Aug. 27, 2009, 5 pgs.

Ikeda, Minoru, "Basic Course," Nikkei Computer, Japan, Nikkei BP, Mar. 2, 1998, No. 438, p. 222-27.

* cited by examiner

SYSTEM, METHOD, AND SOFTWARE FOR INSERTING HYPERLINKS INTO DOCUMENTS

RELATED APPLICATIONS

This application is a continuation of U.S. patent application Ser. No. 09/237,219, filed on Jan. 25, 1999 now U.S. Pat. No. 7,003,719, which is incorporated herein by reference.

TECHNICAL FIELD

This invention concerns computer systems and software, particularly computer networks, word processors, and document processors that facilitate insertion of hyperlinks into electronic documents.

BACKGROUND OF THE INVENTION

Personal computers have a wide variety of uses. One of the most common uses is as a word processor, a device that allows electronic creation and manipulation of documents, such as letters, resumes, research papers, and legal briefs. Another common use is to communicate with other computers via a network, such as, the Internet—a worldwide network of computers interconnected through public and private communication systems. Recent years have witnessed the convergence of these seemingly distinct uses through the World Wide Web.

The term "World Wide Web" generally refers to a portion of the Internet that encompasses electronically linked documents written with special internal format codes, such as the hypertext markup language (HTML.) Within the Web, each document has a unique identifier, known as a uniform resource locator (or URL) which serves as its unique electronic address. The URL for any document can be included as part of one or more other Web documents, providing a selectable link—more precisely, a hyperlink—between the documents. With proper computer software and Internet access, a user of a document including a hyperlink to another document can select the hyperlink, which is normally displayed in a contrasting color from other text in the document, using conventional point-and-click commands.

Selecting the hyperlink connects the computer hosting the document with the hyperlink to the computer hosting the document associated with the hyperlink (the hyperlinked document), and ultimately allows the user who invoked the hyperlink to view the hyperlinked document, which can be located anywhere in the world. The hyperlinked document can also contain hyperlinks to other documents, allowing the user to "hop" around the world viewing various hyperlinked documents at will.

Hyperlinks are typically inserted into documents manually or automatically. Manual insertion often occurs through a document editor or word processing program, such as Microsoft Word 6.0 or Corel WordPerfect 8.0, that includes a hyperlink definition capability. More particularly, manual insertion requires a user to select text in a document, to indicate a desire to associate a hyperlink with the text, and then to enter the URL for the document to hyperlink to. For example, a user writing a paper on the American Revolution might select text referring to George Washington and insert the URL for a document providing a brief biography of George Washington. However, manual insertion of hyperlinks can be not only tedious and time-consuming, but also error prone.

Conventionally, one of few methods for automatic insertion of hyperlinks is through execution of an index-generation program, which builds an alphabetical "back-of-the-book" type index for a document. For example, WebAnchor™ software from Iconovex Corporation of Bloomington, Minn., uses semantic (meaning-based) analysis to extract key words, phrases and ideas from one or more documents and then automatically builds an index that includes hyperlinks to those extracted words, phrases, and ideas in the documents. A user viewing the index can select a word, phrase, or idea in the index and then hyperlink to the specific portion of the document containing it. (See also U.S. Pat. No. 5,708,825, entitled Automatic Summary Page Creation and Hyperlink Generation, filed May 26, 1995 and issued Jan. 13, 1998.)

One problem in using conventional manually and automatically generated hyperlinks concerns their longevity. In particular, as documents containing hyperlinks age, many hyperlinks become out dated and ineffective because the documents they point to have been deleted, revised, or moved to other computers, or because the computer hosting a hyperlinked document no longer recognizes or understands one or more parts of the URL for the hyperlink. Whatever the reason, attempting to execute or invoke these ineffective hyperlinks results in an error message, such as "file not found," being shown to the user instead of the desired document. Although the user, can update or replace the URL associated with an ineffective hyperlink, this can be inconvenient and time consuming, particularly in documents with many hyperlinks.

Another problem with manually and automatically generated hyperlinks concerns the time or cost of accessing the hyperlinked documents. In particular, hyperlinks are typically generated without regard to either the time needed to execute a hyperlink or the charges a user may incur in hyperlinking to specific host computers. This is especially troublesome when a user wastes time or incurs charges hyperlinking to a document on another computer system that also exists on her computer system.

Accordingly, there is a need for hyperlinks that are less likely to become ineffective over time and that are generated with concern for user preferences, such as connection time and cost.

SUMMARY OF THE INVENTION

To address these and other needs, the inventors devised a system, method, and software that automatically locate and mark specific portions of a document and define hyperlinks including at least a portion of the marked text. An exemplary implementation of the method finds and marks legal citations—for example, references to court opinions, government laws, and legal treatises—and automatically defines each hyperlink to include at least a portion of a marked legal citation and a name of a common computer system. The exemplary method further entails activating one of the hyperlinks, connecting to a computer system referenced in the one hyperlink, and conducting a search of one or more databases based on the portion of marked text included in the hyperlink. Thus, this implementation of the method avoids the problem of hyperlinks becoming outdated and ineffective by directing them to a common external computer system and including a searchable term as part of the hyperlink instead of a precise document address.

Another feature of the exemplary method defines the name of the common computer system in the hyperlinks based on the cost or time of executing the hyperlink. In particular, the exemplary method determines whether the hyperlinks are to include the name of a local computer system that includes a database, for example, a CD-ROM library, containing legal documents or the name of an external computer system including this information. Another feature of this implementation allows for the possibility that the local computer system lacks this information and redirects failed hyperlinks to a local computer system to the external computer system, which is likely to have a more extensive database.

DETAILED DESCRIPTION OF THE INVENTION

The following detailed description, which references and incorporates FIGS. 1-4, describes and illustrates one or more exemplary embodiments of the invention. These embodiments, offered not to limit but only to exemplify and teach the invention, are shown and described in sufficient detail to enable those skilled in the art to make and use the invention. Thus, where appropriate to avoid obscuring the invention, the description may omit certain information known to those of skill in the art.

DEFINITIONS

The description includes many terms with meanings derived from their usage in the art or from their use within the context of the description. As a further aid, the following term definitions are presented.

The term "document" refers to any logical collection or arrangement of machine-readable data having a filename.

The term "database" includes any logical collection or arrangement of machine-readable documents.

The term "hyperlink" includes any token conforming literally or functionally to any past, present, or future Uniform Resource Locator (URL) standard. It also includes any token including information identifying a specific computer system or networked device.

The term "program modules" include routines, programs, objects, data structures, and instructions, or instructions sets, and so forth, that perform particular tasks or implement particular abstract data types.

Exemplary Computer System Embodying the Invention

Figure 1:
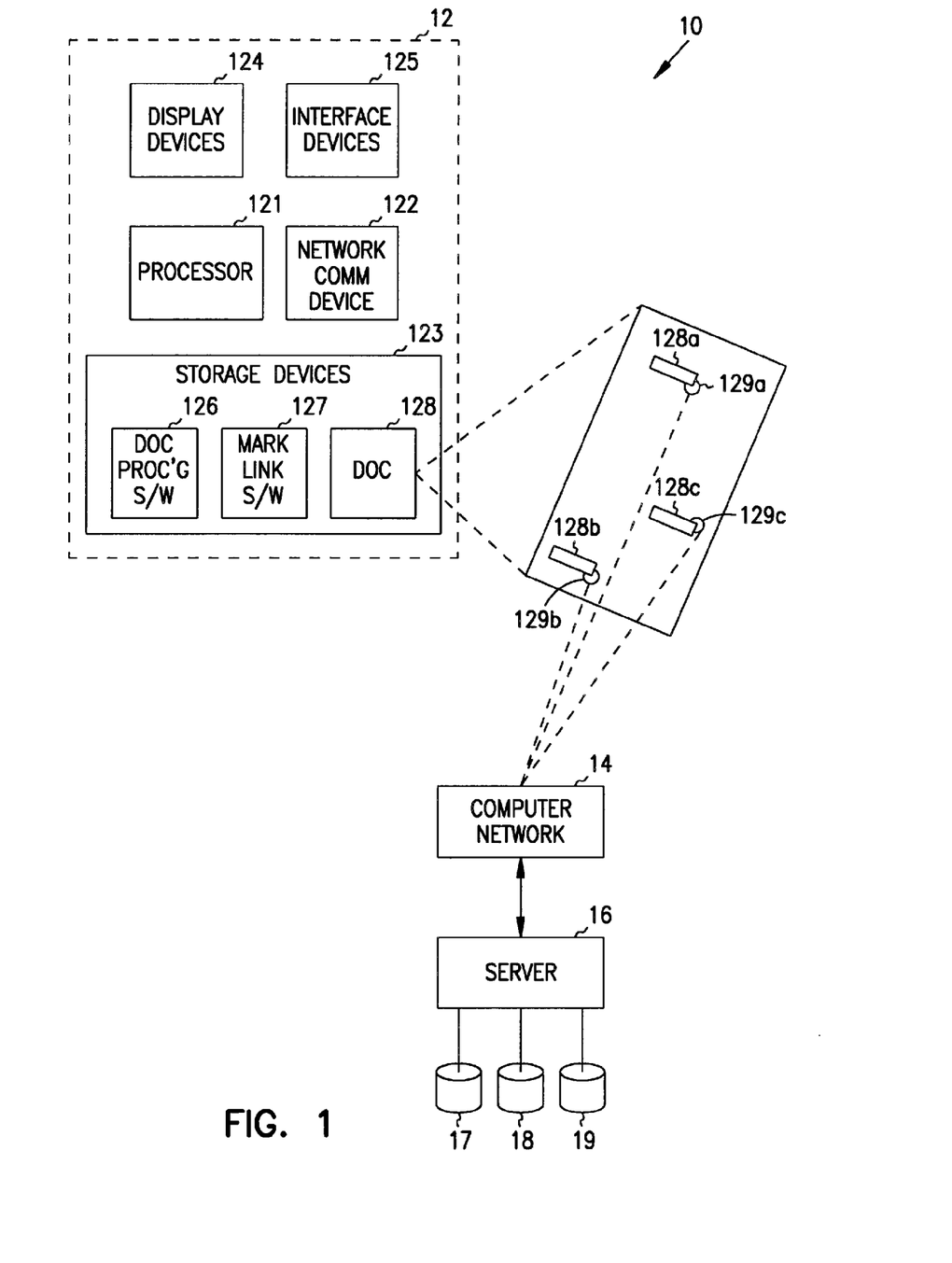
FIG. 1 is a block diagram of an exemplary computer system 10 embodying several aspects of the invention.

FIG. 1 shows a diagram of an exemplary computer system 10 incorporating a system, method, and software for automatically marking one or more portions of a document and defining one or more corresponding hyperlinks for each marked portion. Generally, system 10 comprises an exemplary personal computer 12 which hosts an exemplary document 128. Exemplary document 128 includes marked portions 128a, 128b, and 128c and respective hyperlinks 129a, 129b, and 129c, which are automatically generated and defined according to an exemplary embodiment of the invention. Hyperlinks 129a, 129b, and 129c are selectable to link respective marked portions 128a, 128b, and 128c of document 28 to databases 17, 18, and 19 via computer network 14 and web server 16. (In the exemplary embodiment, the hyperlinks are embedded "on top of their associated marked text, that is, in place; however, in other embodiments, they are on a separate page of the document.)

More particularly, the most pertinent features of computer 12 include a processor 121, a network communications device 122, and a data-storage device 123. Additionally, system 12 includes display devices 124 and user-interface devices 125. In the exemplary embodiment, processor 121 is an Intel Pentium II processor; network communications device 122 is a 56-Kilobyte-per-second (or higher-speed) modem; and storage device 123 include one or more hard drives. However, other embodiments of the invention, use other types of processors, network communications devices, and data-storage devices. For example, other embodiments use distributed processors or parallel processors, and other embodiments use one or more of the following data-storage devices: a read-only memory (ROM), a random-access-memory (RAM), an electrically-erasable and programmable-read-only memory (EEPROM), an optical disk, or a floppy disk. Exemplary display devices include a color monitor and virtual-reality goggles, and exemplary user-interface devices include a keyboard, mouse, joystick, microphone, video camera, body-field sensors, and virtual-reality apparel, such as gloves, headbands, bodysuits, etc. Thus, the invention is not limited to any genus or species of computerized platforms.

System 12 also includes, within data-storage device 123, document-processing software 126, document-marking-and-linking software 127, and an exemplary document 128. In the exemplary embodiment, exemplary document-marking-and-link-building software 127 is an add-on tool to document-processing software 126. However, in other embodiments, it operates as a separate application program or as part of the kernel or shell of an operating system. (Software 126 and 127 can be installed on system 12 separately or in combination through a network-download or through a computer-readable medium, such as an optical or magnetic disc, or through other software transfer methods.) General examples of suitable document-processing software include word-processing programs, HTML-editing programs, spread-sheet programs, presentation-development programs, browsing programs, document-management programs, and file-backup programs. More particular examples include Microsoft Word97 software, Corel WordPerfect 8.0 software, Microsoft Explorer 4.0 software, Netscape Navigator 4.0, Microsoft FrontPage 98, Adobe Acrobat Exchange, and Adobe Acrobat Reader software. Thus, the invention is not limited to any particular genus or species of document-processing software.

FIG. 1 also shows that exemplary document 128 includes portions 128a, 128b, and 128c which have been marked, for example, visibly in a contrasting color or font, or in other ways, to signify its association with an existing hyperlink. Document 128 also includes hyperlinks 129a, 129b, and 129c that are associated logically with respective portions 128a, 128b, and 128c. Hyperlinks 129a, 129b, and 129c which are defined in accord with the present invention, can be activated (in accord with conventional techniques) for example, to create a network connection to respective searchable databases 17, 18, and 19 via computer network 14 and web server 16. (Although FIG. 1 shows that the hyperlinks all point to server 14 in the exemplary embodiment, other embodiments of the invention generate hyperlinks that point to the same or multiple web servers.)

In the exemplary embodiment, computer network 14 is a wide-area network such as the Internet; however in other embodiments it is a local-area network, or an ethernet. Server 16 is a web server, such as a Microsoft Internet Information Server 4.0 running on a network of several NT servers with Pentium class processors and extended memory and disk configurations. Though not shown explicitly in FIG. 1, server 16 includes URL processing software in accord with the invention (as described below.) Databases 17, 18, and 19 can take on any number of forms on a variety of computer platforms. Moreover, databases 17, 18, and 19 include overlapping content in some embodiments to allow for more than one computer, like computer 12, to hyperlink simultaneously to multiple copies of the same document. Thus, domain server 14 includes software capabilities such as that described in U.S. Pat. No. 5,644,720 entitled Interprocess Communications Interface for Managing Transactions Requests and issued Jul. 1, 1997. (This patent is incorporated herein by reference.)

Exemplary Architecture of
Marking-and-Link-Building Software

Figure 2:
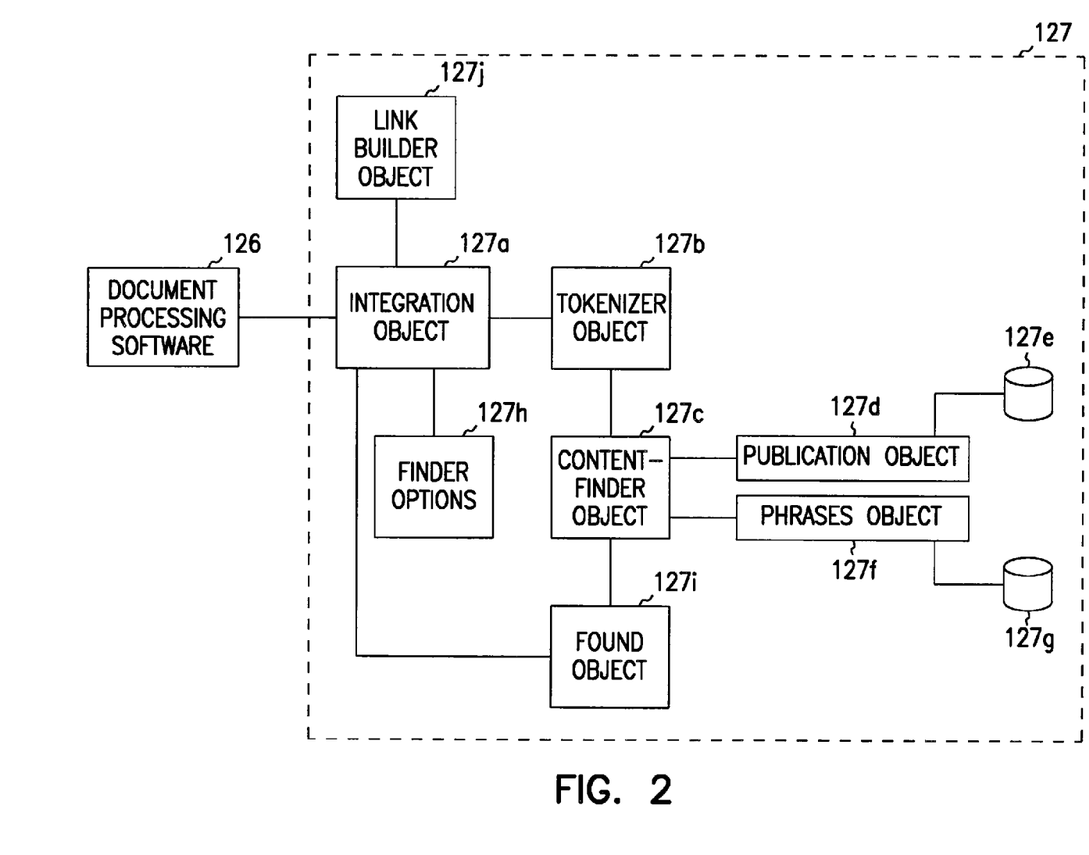
FIG. 2 is a block diagram of exemplary marking-and-linking software embodying the invention.

FIG. 2 shows an exemplary architecture for marking-and-link-building software 127, specifically a component-based architecture including one or more objects. The objects expose their functionality and communicate with other objects using COM (Component Object Model) interfaces. However, for clarity many of these interfaces have been omitted from the figures. The exemplary software is tailored to find, mark, and build hyperlinks for legal citations. However, other embodiments of the software operate similarly on proper names of persons or places, or other identifiable document content, which can be isolated and identified by syntactic, formatting, contextual, semantic, or document markup information.

More particularly, exemplary software 127 includes an integration object 127a, a tokenizer object 127b, a content-finder object 127c, a publications object 127d, a publication database 127e, a phrases object 127f, a phrases database 127g, an options object 127h, and a link-builder object 127i. Integration object 127a functions to integrate the software as a tool into document-processing software 126 according to conventional techniques. Integration object 127a takes data from an active document in an active edit window of document-processing software 126 and passes it to tokenizer object 127b, as a stream of text. (In one embodiment, Integration object actually passes the text to the content-finder object, which then in turn passes it to the tokenizer object) Integration object 127a is also responsible for creating and initializing several other objects, such as tokenizer object 127b and content-finder object 127c and link-builder object 127h. (In one embodiment, the integration object does not always create the tokenizer object. If the integration object does not specify to the citefinder object which tokenizer object to use, the citefind object will create and use the default text tokenizer. This is the case in the exemplary Word and WordPerfect implementations. In the HTML implementation, the integration object creates the HTML tokenizer and passes it into the citefinder object.)

In the exemplary embodiment, the procedure for extraction and formatting depends on particulars of the client application, or document-processing software. For example, in Microsoft Word, the integration object uses the Word object model to retrieve the text and in Corel WordPerfect the Integration object (third party handler) sends the WordPerfect application specific PerfectScript tokens that instruct the WordPerfect application to select the requested text and then retrieve the text from the current selection. The integration object uses registry settings to determine how much text to extract each time, with the amount of text largely dependent on the document-processing software. After extracting the text, the integration object then optionally pre-formats the text, specifically removing any application specific codes before passing the text to an input text buffer of tokenizer object 127b.

Tokenizer object 127b receives, buffers, and parses the stream of text into a collection of tokens, which it passes to content-finder object 127c. In doing so, tokenizer object 127b, which assumes a variety forms depending on the actual form of the text it receives for tokenization, insulates content-finder object 127c from the actual format of the text, that is, it removes fonts and other features of the text that are deemed to carry no distinguishing value in locating legal citations. (However, in other embodiments, this formatting may carry useful semantic information and thus is not removed.) In one embodiment, software 127 includes several tokenizers, for example, an HTML tokenizer, a Microsoft Word tokenizer, a WordPerfect tokenizer, an Adobe Acrobat tokenizer, a text tokenizer, an RTF tokenizer, an XML tokenizer, a Microsoft Word Format tokenizer, a WordPerfect Format Tokenizer, and an Adobe PDF format tokenizer. In multi-tokenizer embodiments, document-processing software 127 selects or defines which one is necessary for the applicable text. If no specific tokenizer is specified, software 127 uses a default tokenizer object, which parses and creates tokens from straight UNI-CODE text.

An important feature of tokenizer object 127b is that it can retrieve tokens as it moves both forward and backward through a text buffer and thus can parse in both directions. (In the exemplary embodiment, the text buffer holds a portion of the text in UNICODE format.) This is useful when trying, for example, to find the title for a located citation that spans more than one text buffer. The tokenizer in the exemplary embodiment saves a portion of the preceding text buffer since it is possible that some citations (or tokenizable content) will span two or more buffers. This buffer manipulation is completely hidden from content-finder object 127c, allowing it to focus on whole tokens and the finding of legal citations.

Each token created by tokenizer object 127b contains information that identifies what the entity is and where it is located in the document. For example, a text character is considered a single token. As another example, consider the HTML tag for line break <br>. An HTML implementation of the tokenizer treats this tag as a single token that represents a new line, even though it is four characters long. So the content-finder object only has to deal with a single new line token and does not have to "worry" that it is represented as <br> in one format and "0x0d" in another.

Content-finder object 127c processes tokens from tokenizer object 127b, specifically looking for citations. In processing the tokens, it interacts with publication object 127d and phrase object 127f to locate legal citations. In the exemplary embodiment, content-finder object 127c processes only a predefined collection of tokens, so that it requires no modification to support a new text format. One only needs to add a new tokenizer object to support tokenization of the new text format. Based on the options set in options object 127h (described below), the content-finder object scans the tokens for legal citations.

When a citation is located, the content-finder object creates a found object, which encapsulates the information for the found citation, and passes the found object to the client via a content-finder event object through an outgoing event interface.

Content-finder options object 127h provides a mechanism for the content-finder client (document-processing software 126) to control or adjust properties of the cite-finding process. The client can indicate what types of cites they want to locate, as well as setting other options that control how the cites are located. The following list identifies and describes options available in the exemplary embodiment and other embodiments of the invention:

| | |
|---|---|
| FindCaselaw | Indicates whether caselaw authorities should be located |
| FindStatutes | Indicates whether statute authorities should be located |
| FindLawReviewAndJournals | Indicates whether law review and journal authorities should be located |
| FindCourtRules | Indicates whether court rule and order authorities should be located |
| FindAdmins | Indicates whether administrative report and decision authorities should be located |
| FindRegulations | Indicates whether regulation authorities should be located |
| FindShortForms | Indicates if short form citations should be located |
| FindTitles | Indicates if titles should be found |
| FindInQuotes | Indicates if authorities within quotations should be located |
| OverlapSize | Amount of previous buffer saved when new buffer is passed in |
| MaxTitleLength | Maximum length of a title |
| MaxNumberLength | Maximum length of a number |
| MaxEditorPhraseLength | Maximum length of editor phrase |
| MaxKeywordPhraseLength | Maximum length of a keyword phrase |
| MaxStatuteKeywords | Maximum number of words examined when locating statute keywords |
| MaxStatutePubWords | Maximum number of publication words allowed in a statute authority |
| MaxCourtLength | Maximum length of court name |
| MinCourtLength | Minumum length of court name |
| MaxDateLength | Maximum length of a date |
| MaxExtensionPageDiff | Maximum distance allowed between page numbers considered to be part of same authority |
| BeginningYear | Specifies first number recognized as a year |
| EndingYear | Specifies last number recognized as a year |

In the exemplary embodiment, these options cannot be set by the user, although other embodiments allow this. The properties and definitions that can be changed (see note in next paragraph) are the same as the list of options above. The property is the thing (like BeginningYear); the method is the way to change the property. (See Table above.)

To optionally change a cite-finding option in the exemplary embodiment, document-processing software 126 creates an instance of the content-finder options object and a conventional interface to set the desired properties. The pointer to the created interface is then passed to content-finder object 127c. If the document-processing software does not create an instance of the content-finder options object, content-finder object 127c creates one that contains default settings.

Found object 127i, one or more of which is created by content-finder object 127c, encapsulates all the information about found content, such as a legal citation in the exemplary embodiment. This includes information such as the citation category, the citation form (main, short, id, infra, parallel citation, string citation), the citation title and the citation location (in the text.) In other embodiments, it includes information concerning key words or key content in a portion of the extract text. (See, for example, U.S. Pat. No. 5,708,825, entitled Automatic Summary Page Creation and Hyperlink Generation, which incorporated herein by reference.)

Publications object 127d, as noted earlier, assists content-finder object 127c in locating specific content, such as legal citations. In doing so, it interacts with publication database 127e, which supplies access to a list of valid publications and their associated abbreviations. Each publication has one or more abbreviations, aliases, or alternative names associated with it. Publication abbreviations typically occur in legal citations for a specific case, statute, article or other document within a publication. For example, 'S. Ct.'—an abbreviation for the Supreme Court Reporter publication—often occurs in cites to specific U.S. Supreme Court cases, for example Talley v. California, 80 S. Ct. 536 (1960). Thus, cite-finding object 127c uses the publications object 127d and publication database 127e to determine if a given text string is a valid publication abbreviation or not. This function entails creation use of a publication-information object, which represents a single publication through a presentation of its properties, such as its display and court name, the category it belongs to (for example, case law), its jurisdiction (state or federal), the services of a domain server that it is available on (for example, KeyCite data-retrieval services) and information regarding its location and the location of its abbreviations in the publication files.

Publications object 127d also supports adding, modifying and deleting publications and abbreviations within publication database 127e. The exemplary embodiment allows a user to modify this list through a user interface using conventional interfacing techniques. Examples of specific modifications include: adding a new publication (including defining the category it belongs to, its display and court name and its list of abbreviations); adding new abbreviations for predefined or user defined publications; modifying or deleting abbreviations added by the user for both predefined and user defined publications; modifying any property of a user-defined publication; an deleting any user-defined publication. As a safeguard, the exemplary embodiment precludes users from deleting predefined abbreviations or publications.

Example of suitable publications include those listed in past, present, and future editions of The Blue Book: A Uniform System of Citation, compiled by editors of the Columbia, Harvard, and University of Pennsylvania Law Reviews. (Additionally, the exemplary embodiment includes publications listed in past, present, and future editions or versions of the California Code Yellow book and in past, present, and future editions of the California Style Manual by Robert E. Formichi (1986.)

Phrases object 127f and phrase database 127g are similar to the publication object and database, except that they assist content-finding object 127c determine whether text extracted from a document includes citation-related phrases. The object fetches each phrase in a list of phrases and determines if each is contained in the list. It also allows the user to add, modify or delete phrases. Each instance of the phrases object accesses a single phrase list. A phrase list is physically represented by two files. One file contains the standard, predefined phrases, which in the exemplary embodiment, cannot be modified or deleted; and the other file stores user changes and additions to the standard phrase list. The phrases object merges the two files together into a unified, sorted list of phrases. In the exemplary implementation, no distinction is made between the standard and user defined phrases when searching for a phrase or when retrieving the phrases, but this is not a requirement. However, the client can determine if a returned phrase is a standard or user defined phrase.

Phrases database 127g includes several lists of phrases in the exemplary embodiment. These lists are identified and described below and included in full as Appendix A:

| Phrase List | Description |
| --- | --- |
| Date | Month names and abbreviations that are used to determine if a string is a date |
| Explanatory | Explanatory phrases that are used to determine if a citation is explanatory history for the previous citation |
| Extension | Phrases that can be used in conjunction with short form references, like id, infra, and supra |
| Identifying | Contains a list of identifying phrases |
| Invalid Caselaw Publication | Phrases that cannot be contained in a valid case law publication |
| Invalid Statutes Publication | Phrases that cannot be contained in a valid statutes publication |
| Invalid Title | Phrases that cannot be contained in a valid title |
| In Re | List of in re phrases that are valid at the beginning of a title |
| Keyword | Keyword phrases that can be used in a statute citation |
| Other Caselaw | Other phrases that can be used in a case law citation |
| Title Word | Lower-case single word phrases that are allowed to be included in a title |
| Title Words | Lower-case, multi-word phrases that are allowed to be included in a title |
| Versus | Phrases that can be used to represent 'versus' in a title |
| Weight of Authority | List of weight of authority phrases that will be included with a case law citation |

Link-builder object 127j builds, or defines, hyperlinks, such as hyperlinks 129a, 129b, and 129c, according a URL standard in accord with the invention. More particularly, once content-finder object 127c creates a found object 127c, link-builder object defines a URL for the object. The URL in the exemplary embodiment includes a domain name and at least a portion of the text with which it will be associated, thus enabling a web server, such as web server 16, to associate it dynamically with particular document, even if the document is moved or revised over the life of the hyperlink. Further details on the nature of the hyperlink follows a more detailed description of how the exemplary marking-and-link-building software operates.

Exemplary Method of Finding and Marking Specific Content

Figure 3:
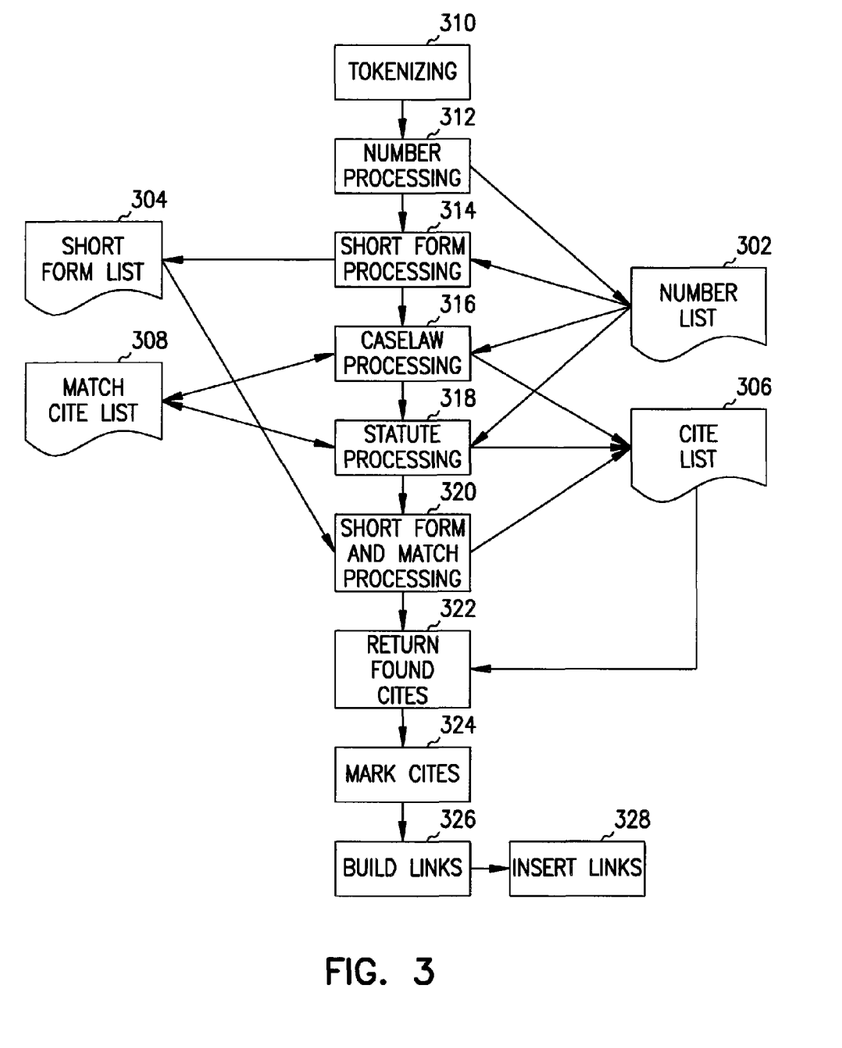
FIG. 3 is a flowchart illustrating an exemplary method embodied in the marking-and-linking software.

FIG. 3 generally shows an exemplary method which software 126 executes in the context of one or more cite-finding sessions initiated by document-processing software 127. Each cite-finding session relates to a single document. Specifically, FIG. 3 shows that the exemplary method includes process blocks 310, 312, 314, . . . , 328, which when executed affect a numbers list 302, a short-form list 304, a cite list 306, and a match-cite list 308.

Number list 302 includes all the numbers found in the current buffer and the text buffer location of each number. Once the processing of the current buffer is completed, number list 302 is cleared. Short-form list 304 includes all unmatched short forms that have been located during the entire session. In this context, short forms are considered any citation that is referenced using the terms id, ibid, infra or supra. Short-form list 304 also stores the location of each short form reference in the document. The lifetime of this list is the same as the session, meaning that it lives as long as document text associated with a given session is being processed. As soon as a short form is matched to its full-form citation, it is removed from short-form list 304 and added to cite list 306.

Cite list 306 includes all matched cites found in the current text buffer. Once the processing of the current buffer is complete, the content-finder object loops through the cite list and returns each of the citations to the document-processing software 127 (via integration object 127a) in the form of a found object. After returning all the cites, this list is cleared. Match-cite list 308 includes the unique full-form citations that have been found since the beginning of the session. It is used to match non-full form cites (short-form cites) to their corresponding full-form citations. This list is not cleared until the session terminates.

Before describing each processing block, it may be helpful to understand that there are several similarities between the processing steps of the exemplary method. First, each examines the current buffer using tokenizer object 127b to request tokens for the current buffer. Second, each block can result in a change to the buffer restart position. The restart position specifies the position at which processing (parsing) will start the next time a buffer is passed in by the document-processing software. For example, if the content-finding object finds a partial number during number processing in block 312 but reaches the end of the current buffer before finding the end of the number, it will set the restart position to the beginning of the number so that it will be picked up during the processing of the next text buffer, which be enlarged to include a portion of the previous buffer with the partial number.

Generally, after a session is initiated, document-processing software 126 (through integration object 127a) repeatedly passes sequential buffers of text from the document to tokenizer 127b, which converts the text into tokens and passes them (on request) to content-finder object 127c which executes many of the processing blocks. More particularly, block 310 shows that initial processing entails extraction of text from a document in an editing window of document-processing software 126. In the exemplary embodiment, integration object 127a extracts and formats the next buffer of text from the current document. After extracting the text, the integration object optionally pre-formats the text. It examines the text for any application specific codes and then removes the codes from the buffer.

Block 312 entails tokenizing the text extracted from the document. In the exemplary embodiment, processor 121, or more precisely processor 121 acting through integration object 127a, passes tokenizer 127b a new buffer of text from document 128, for example. Tokenizer object 127b maintains the internal buffer of text. When it receives a new buffer of text, it determines where in the buffer to start parsing and how much of the old buffer to retain. To determine a start-parsing position, it first checks if one or more of the processing steps specified a restart position during the last processing round. If so, it takes the specified restart position that is farthest from the end of the old buffer as its new start parsing position. If no restart position was indicated during the last processing round, then the start parsing position is the beginning of the new buffer. The Tokenizer object then updates its internal text buffer, retaining a certain number of characters from the old buffer and appending on the new buffer. (In the exemplary embodiment, the start parsing position defaults to 500 characters back from the new starting position, and text is tokenized on the fly as it is requested.)

After tokenizing the text in block 310, the processor, through content-finding object 127c, executes number-processing block 312. Number processing entails sequentially requesting each token in the buffer from the tokenizer object and scans forward through the tokens to locate valid numbers. This is the only time in the exemplary embodiment of the cite finding process that the buffer is completely scanned from beginning to end. Once a token representing a valid number is found, the content-finder object adds it to the number list along with its beginning and ending positions within the text buffer. If the processor reaches the end of the buffer before completing a number under "construction," it will specify a parsing restart position to the beginning of the number, so that during the next processing round the full number can be tokenized.

Short-form processing block 314 entails scanning forward through the tokens to locate the words id, ibid, supra, and infra. When one of these words is found, the process adds a short-form entry to the short-form list. The short-form entry includes the position of the short form and its type (id, supra or infra). If the processor reaches the end of the buffer with part of a potential short-form entry (for example, the text buffer ends with 'su' which could turn out to be 'supra') it will set the restart parsing position with the tokenizer object to the beginning of the potential short form so that the tokenizer will address this during the next round of tokenization.

After identifying all the complete short-form terms in the current text buffer, the processor loops through each of the short forms, associating found titles or numbers with each short form. To find the title for the short form, the processor first asks the tokenizer to jump to beginning of the short form in the buffer. It then scans a pre-determined number of tokens (for example, either to the last citation or two hundred tokens characters) backwards from the beginning of the short form. Using capitalization rules and a number of phrase files (Invalid Title, Title Word, Title Words and Versus), it determines if a title is found. If a title is found, the title information is added to the entry in the short form list and the starting position of the short form is updated to the beginning of the title.

In addition to finding a title for each short form, the processor also tries to attach associated numbers to the short form. For each short form in the list, it will scan through the number list to find the first number that follows the end of the short form. If the distance between the end of the short form and the beginning of the number is within a given threshold, for example, the processor will examine the text between the short form and the number. If the text contains an extension phrase (based on contents of an extension list), the number is considered to be associated with the short form. The number is marked as being used in the number list and the short form entry is updated to include the number information in the short form list. (Though shown sequentially in FIG. 3, number-processing block 312 and short-form-processing block 314 are executed concurrently in the exemplary embodiment.)

In block 316, the processor, again through content-finder object 127c in the exemplary embodiment, identifies case law-like citations. Case law-like citations are those citations including a <volume><publication> structure. In identifying these citation forms, the exemplary method does not re-parse the entire buffer, but instead examines the text surrounding each of the numbers previously located in the buffer by the number processor.

In examining this surrounding text, the processor first determines whether the first word before the number is the word 'at'. If it is, then this number is flagged as not being part of a full-form citation. Next, the processor tries to locate a valid case law-like publication for the potential citation that precedes the number. In doing so, the processor determines how far to go back to look for the potential publication, taking the minimum of the distance between the start of the current number and the end of the previous number (if there is one) and the pre-defined maximum length of a publication. It then calls the Publications object to determine if this text contains a publication.

If the text does not contain a publication and there is an active cite pending, then the processor checks to see if the number is an extension page or note reference for the pending cite. This is the case if the page number for the cite and the current number being processed are separated by a comma or words such as "n." or "fn." If the number is an extension page or note reference, then it is added to the pending cite and marked as used. If it is not the case, the pending cite is completed and added to the cite list. In either case the processing for the number is ended.

At this point, the processor assumes a publication has been found. If there is no previous number, then the publication must support a zero volume. This is a property of the PublicationInfo object. If there is no previous number the publication does not have a zero volume, then the processing of the number is ended. A valid <volume><publication> combination has now been located. The current number is considered the page number and the previous number (if exists) is considered to be the volume. Next, the processor then checks if there is a title associated with the <volume><publication> combination.

Next, the processor determines if the just-found "<volume><publication>" combination is the start of a new cite or if it is associated with a pending cite. If there is a cite already active and it is separated from the <volume><publication> combination by only the comma character, then the <volume><publication> combination is considered to be a parallel for the active cite. If this is the case, the <volume><publication> combination is added to the pending cite, the current number is marked as used and the processing of the current number is ended.

If the volume-publication-page combination is not a parallel for a pending cite, then it is considered the start of a new cite. If there was an active cite, it is completed and added to the cite list. At this point, the processing of the number is ended and the current number is marked as being used.

At several points in the caselaw processing, cites are deemed completed and added to the cite list. When a cite is completed, there is actually some additional processing that takes place in the exemplary embodiment. In particular, the text that immediately follows the citation is scanned, that is, searched, to locate and evaluate any associated parenthetical information for court-and-date or weight-of-authority information. If so, then the parentheses is included as part of the citation. Next, the case law processor checks to see if the current cite is a history cite for the previous cite. If the two cites are separated only by an explanatory phrase, then the current cite is deemed a history cite for the previous cite. When this occurs, the current cite is appended to the previous cite. At this point, a complete citation has been located.

The next step is to determine if this cite matches any of the citations that were previously used in the document. To do this, the processor loops through the match cite list to see if it can find a match to its newly found cite. If a match is found, the new cite is given the same match text as the cite that it matches. This match text is used to build a cite entry for a Table of Authorities (TOA). All of the cites with the same match text will be included as a single entry in the TOA. If no match is found in the match cite list and the cite is a full form cite, then it is added to the match cite list. In either case, the cite is added to the cite list.

If there is an active cite pending when the end of the buffer is reached, the case law processor will set the restart position using the Tokenizer object to the beginning of the pending cite.

In block 318, the processor attempts to identify all statute-like citations. Similar to the case law processor, the statute processor examines all of the unused numbers in the number list. (Numbers are marked of as used in checking for short forms and case law.) Because case law processing is done first, many of the numbers in the number list will already be included as part of a citation and marked as used in the list. The statute processor skips all of the numbers that are marked as used and processing those that have not been marked as follows.

First, if a statute-like publication has not already been found (no pending cite), then the processor check to see if this is a cite that starts with a statute keyword. In doing so, the processor tries to locate a valid statute keyword that precedes the number, using the keyword phrases file. If a keyword is found, then a new pending cite is created with the starting position of the keyword taken as the start of the potential cite. A valid publication must be found before this becomes an actual cite.

Second, if a publication has not already been found and the statute processor did not find any keywords preceding the current number, then it will check for presence of a valid publication before the number. This is done as in case law processing. If a publication is found, then the processor adds the publication and the current number to the pending cite if there is one, or if not, it creates a new pending cite.

Third, if a publication had already been found, then it checks to see if there is a statute keyword between the current number and the previous number. If so, then the end of the cite is set to the end of the current number. If there is no statute keyword between the current and previous number, then the pending cite is deemed completed and added to the list.

Just as in case law processing, further statute processing entails trying to match all completed statute-like cites to those found in the match cite list. If a match is not found then the cite is added to the match cite list. All statute cites that are found are also added to the cite list. If there is an active cite pending when the end of the buffer is reached, the processor sets the restart parsing position (used in tokenization) to the beginning of the pending cite.

In block 320, the processor performs short form and match processing, which entails match the short-form cites (id, ibid, infra and supra) stored in the short-form list to the complete full-form cites they reference. (Short forms were identified in block 314.) Execution of this block is appropriate at this point in the exemplary embodiment, since all the case law-like and statute-like citations in the current buffer have been located.

More particularly, the processor takes each of the entries in the short form list and tries to match it to its corresponding cite stored in the cite list. Based on the type of the short form, the processor compares the starting and ending positions and/or the titles of the short form to find its match in the cite list. Once a match is found, the short form is removed from the short form list and added to the cite list. Before it is added to the cite list, it is updated with information from its matching cite. However, not every short form cite will be matched each time. For example, an infra may be used to refer to a cite that is used much later in the document and has not yet been found by content-finder object 127*c*. Therefore, the short form list is not cleared until after the session has been completed.

In block 322, content-finder object 127*c* notifies the client, that is, document-processing software 126, through integration object 127*a* about each of the found citations listed in the cite list. More particularly, the content-finder object creates a found object 127*i* (also referred to as a found object in the exemplary embodiment) for each listed cite, using the information in the cite list entry to fill in the properties of the found object. The content-finder object then triggers a cite-found event that is captured by the client, with the found object specified as a parameter of the cite-found event. After all of the cites have been returned to the client, the cite and number lists are cleared.

In block 324, the processor, through integration object 127*a*, marks each of the found cites in the document. In the exemplary embodiment, this entails getting the citation position from each of the found objects and locating the citation in the original text of the current document. Integration object 127*a* then marks the citation (or found text) with the appropriate hyperlink. First, it examines the text in the range of the citation to determine if any hyperlinks already exist. Then, depending on an overwrite-existing-hyperlinks option (defined in the cite-link options object), it will either overwrite the existing hyperlink(s) or it will not insert the conflicting hyperlink.

In block 326, integration object 127*a* calls link-builder object 127*i* to build a URL for the marked citation or other portion of the document. In doing so, the Integration object passes the link-builder object the desired destination of the URL based on a user setting defining whether computer 12 includes or has access either directly or via a local-area network or enthroned to a CD-ROM library or online database library that contains legal documents that may be related to those cited in the marked portions of document 128 and the link text for the citation retrieved from the Found object. The link text is the standard form of the citation that is used when linking to the citation. The link-builder object then returns the properly formatted URL that will execute a find on the specified citation when activated.

In block 328, the integration object takes the URL from the link-builder object and instructs document-processing software 126 to insert a hyperlink including the URL over the range of text encompassing the found citation. The particulars of inserting the hyperlink dependent on the document-processing software. Details of the exemplary URL structure and content are described below.

After completion of block 328, the exemplary method continues optionally with activities related to generating a Table of Authorities or other found content collection and collation activities (e.g. creation of an index or Table of Contents). In particular, if the user has selected to generate a Table of Authorities (TOA), the integration object will insert the appropriate TOA entry tag for the citation. This entails determining if the citation already has a TOA entry tag. If there is an entry tag for the citation, the Integration object removes it and instructs the client application to insert a TOA entry tag immediately following the citation. How this is accomplished is dependent on the client application. The type of TOA entry tag is also dependent on the whether or not the found citation is a long form or short form. Once all the TOA entry tags have been inserted, the user can select to generate a Table of Authorities in accord with the particular document-processing software.

Exemplary Persistent URL Standard

In the exemplary embodiment, link-builder object 127*i* applies a consistent URL syntax based on the Internet URL RFC 1738 (which is incorporated herein by reference.) A seminal aspect of the structure is that rather than including a specific filename or location for a document, it includes information that a web server, such as server 16 in FIG. 1, can process to find the document with high certainty. In the exemplary embodiment, the content is assumed to be a legal citation and the hyperlink is built to direct the hyperlink to a server that provides access to legal documents. However, in other embodiments, it can be specific content understood to refer to scientific or academic citations or classes of terms. Even more broadly, one could simply direct hyperlinks to semantically key terms in a document to a common universal data provider. In any case, a major advantage of the predefined structure for automatically generated hyperlinks is that changing the file name or file location within (and in some embodiments without) the domain does not invalidate any hyperlinks referencing the document.

Figure 4:
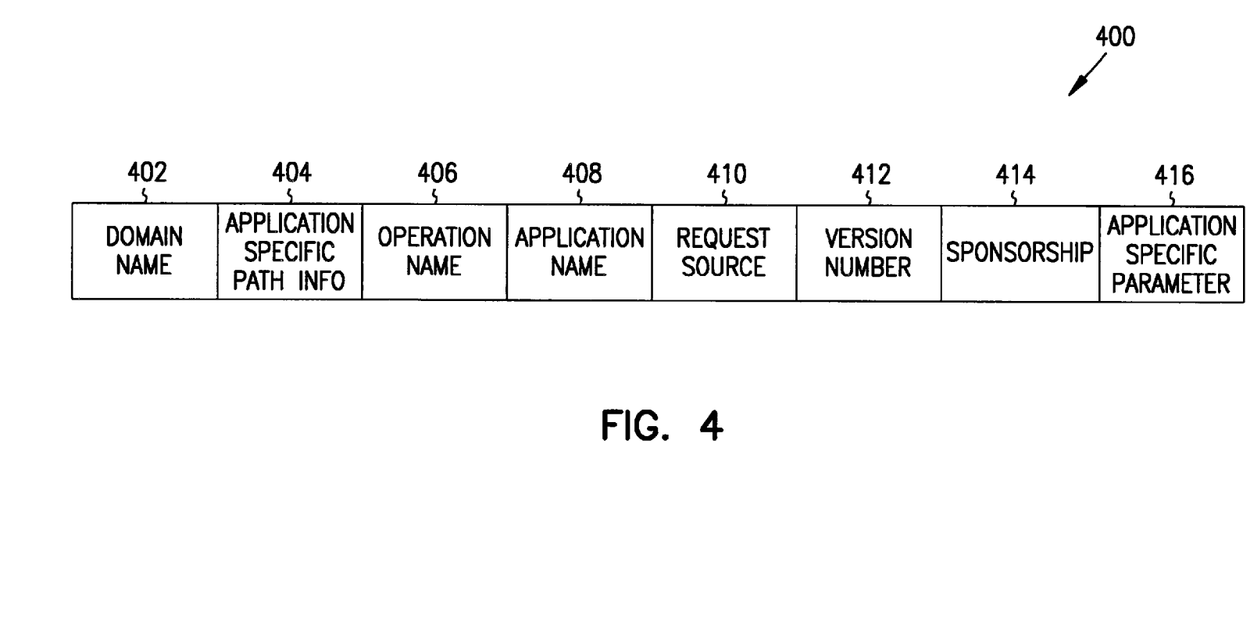
FIG. 4 is a diagram of an exemplary data structure for a hyperlink defined in accord with the invention.

FIG. 4 shows a diagram of an exemplary URL or hyperlink token structure 400.

The structure includes the following fields or elements: domain name field 402, application-specific path information field 404, operation-name field 406, application-name field 408, request-source field 410, version number field 412, sponsorship field 414, and application-specific-parameters field 414. The structure can also be represented as http://www.domain.com/ApplicationSpecificPathInformation/[OperationName]/ApplicationName?rs=RequestSourcen.n&vr=n.n&sp=AlphaString&OperationSpecificParameters=Values&ApplicationSpecificParameters=Values Examples for domain-name field 402 include www.keycite.com, www.westlaw.com, and www.westdoc.com. Examples of application-specific-path information field 404 are subdirectories or electronic commerce token information. Thus, for example, one embodiment of the structure includes customer account information for the particular domain name or a credit or debit account number with associated personal-identification numbers. These can be specified within a computer system, like system 12 in FIG. 1, and inserted by link-builder object 127*i* into a particular hyperlink.

Operation-name field 406 includes information indicating a major, common operation to use in accessing content identified in other parts of the structure. The exemplary embodiment provides the following operation identifiers: 'find', 'keycite', and 'search'. However, other embodiments can identify almost any number of functions.

Application-name field 408 is the name of the application or script that performs a service specified in the URL, for example, based on information provide in the URL. Scripts can conform to the asp (act server page) standard, for example.

Request-source field 410 includes information identifying the application program, such as document-processing software 126, that built the URL and/or invoked the hyperlink, that is, the request for specific content. The exemplary embodiment includes this field in all URLs, even if multiple URLs are used to build the page (for example, HTML frames). This element shows the origin of the URL (q.v. the application originally creating the URL), and the release version number of the origin. The release version number directly follows the request source name. In the exemplary embodiment, the request source value will be set to the current (URL generating) application, even if the original URL was built by a different application. For example, a URL originally built to access content from source will have a particular request source value (e.g. CL1.0), but URL links from that original page will have a request source value appropriate for the content source (e.g. Westlaw). No default value is assigned to URLs of the exemplary embodiment.

Version field 412 indicates which version of the URL syntax standard was used to generate the URL. It identifies the major and minor version number for the syntax standard (for example, vr=2.1). Specifying the version facilitates graceful transitions to future versions of the URL syntax standard. In the exemplary embodiment, this field is not optional; however, in other embodiments it is. Moreover, the exemplary embodiment, link-builder does not assign a default value to URLs.

In the exemplary embodiment, actual values for the request source and version are determined by the document-processing software. These values are to be registered with content provider. The length of the request source should be kept to a minimum, and the request source value should not be used for page presentation information. In the exemplary embodiment, all URLs to content and content images must have vr and rs parameters.

Sponsor field 414, which takes the form "sp=AlphaString" in the exemplary embodiment, is optional and provides a mechanism for subscribers to a particular online database to sponsor use of the database by non-subscribers.

Operation-specific-parameters field 416 takes the exemplary form: OperationSpecificParameters=Values. These parameters and their respective values are used by an application or script at server 16 to service the request. The parameters (for example, 'cite' for a find operation and 'query' for a search operation) are recognized and have meaning within the specific operation or service. An operation specific parameter for unique document id (for example, docid) can also be added so that the application will be able to retrieve a specific, unique document.

Application-specific-parameter field 418 has the exemplary form "ApplicationSpecificParameters=Values" and includes additional parameters and their respective values that an application or script will use to service the request. These parameters are recognized and have meaning only to the application in the exemplary embodiment.

All domains that support the major common operations must use the same OperationName, ApplicationName, and OperationSpecificParameters names defined for that operation. In the exemplary embodiment, the operation-name field can be used to redirect a hyperlink to another domain name based on the operation requested, if the specified operation is not supported by the domain included in the URL with the operation-name field. For example, a user wishing to retrieve the case 101 S.Ct.1, may inadvertently use the URL:

http://www.westgroup.com/find/default.asp?cite=101sct1.

A server, in this case, www.westgroup.com, however, may gracefully redirect the user's request to http://www.westdoc.com/find/default.asp?cite=101sct1 instead of returning a "Not Found" response.

Several other examples of the exemplary hyperlink structure are described below to further illustrate its utility. In the following examples, optional parameters are indicated with square brackets.

Find Service—Document Retrieval
http://www.westdomain.com/find/default.asp?rs=requestsourcen.n&vr=n.n[&sp=alphastring]&cite=document_citation.

In this example, document_citation is part of the specific content found and marked in a document such as document 128 in FIG. 1. For the "&cite=parameter", most standard citation formats are allowed. If an unsupported citation format is used, an appropriate error message will be returned. Spaces within citations should be avoided or replaced by the plus symbol (+). In the exemplary embodiment, completion of this hyperlink requires the request source to be registered with the domain server. The &sp=parameter identifies the sponsor for the request. The operation specific parameter (that is, "&cite=") is a required field to retrieve a specific document. Omission of this parameter gives access to the specified service, but will not retrieve a specific document.

The following examples retrieve 101 S.Ct.1 from a document retrieval service known as WestDoc™:

http://www.westdoc.com/find/default.asp?rs=my-program1.0&vr=1.0&cite=101sct1 or http://www.westdoc.com/find/default.asp?rs=my-source2.0&vr=1.0&cite=101+sct+1

The following examples retrieve 101 S.Ct.1 from a document citator service known as KeyCite™:

http://www.westdomain.com/keycite/default.asp?rs=requestsourcen.n&vr=n.n[&sp=alphastring]&cite=document_citation In this example, the request source must be registered with listed domain server; the "&sp=parameter" identifies the sponsor for the request. The operation specific parameter (i.e., &cite=) is a required to retrieve a specific document; however omission of this parameter still allows access to the specified service. For the "&cite=parameter," most standard citation formats are allowed. If an unsupported citation format is used, an appropriate error message will be returned. Spaces within citations should be avoided or replaced by the plus symbol (+).

The following examples check 107 S.Ct.3102 in KeyCite:

http://www.keycite.com/keycite/default.asp?rs=my-program1.0&vr=1.0&cite=107sct3102 or http://www.keycite.com/keycite/default.asp?rs=my-source2.0&vr=1.0&cite=107+sct+3102

The following URL syntax is used to embed a search within a document:

http://www.westdomain.com/search/defaultasp?rs=requestsourcen.n&vr=n.n[&sp=alphastring]&db=database_identifier&method=search_method&query=query_string&action=action_type In these examples, the request source must be registered with content provider. The "&sp=parameter" identifies the sponsor for the request. The operation-specific-parameters (that is, "&db=, &method=, &query=, &action=") are required fields to retrieve a specific search result. With omission of this parameter, one will gain access to the service, but will not retrieve a specific result. In the exemplary embodiment, the "&db=parameter" must be a valid database identifier code. A list of valid database identifiers must be obtained from the content provider. The valid search methods for the "&method=parameter" are tnc for terms and connectors and win for natural language.

The "&query=parameter" contains the specific search text for the request. If the search method is win, any phrase may be used in the query string. If the search method is tnc, key search words and connectors such as "and" and "or" can be used. Blanks between words can be represented by the plus symbol (+). The exemplary embodiment recognizes a boolean query system used for WestLaw Document Retrieval Service. Appendix B includes a table showing many of the basic commands of this query system. The valid action type for the &action=parameter is search.

This example performs a natural language search in federal case law for insurance liability related to hail storms:

http://www.westdoc.com/search/default.asp?rs=my-program1.0&vr=1.0&db=allfeds&method=win&query=insurance+liability+for+hail+storms&action=search This example performs a terms and connectors search in the Wall Street Journal for the word "earnings" and "surprises" in the same sentence:

http://www.westdoc.com/search/default.asp?rs=my-program1.0&vr=1.0&db=wsj&method=tnc&query=earnings+/s+surprises&action=search This example performs a terms and connectors search in the a Dow Jones "AllNews" database for the terms "IBM" and "buyout":

http://www.westdoc.com/search/default.asp?rs=my-program1.0&vr=1.0&db=allnews&method=tnc&query=ibm+and+buyout&action=search Exemplary Hyperlink Processing Once a hyperlink, such as hyperlink 129a, 129b, or 129c (in FIG. 1), is selected or invoked by a user, computer 12 establishes a connection via communications device 122 and network 14 to server 16. Server 16, which serves the domain name identified in the hyperlink, forms an HTML page that may include the following information:

Users invoking a hyperlink can be asked for a username and/or password for the first access to a service. Subsequent accesses through the same service through the same or different hyperlinks to the same service will not (in most cases) result in another authentication prompt. However, if too much time has elapsed, for example three months, since the last request, authentication is prompted. The amount of time allowable between requests may vary for each service.

The desired content is returned as defined by the service completing the request. The presentation of the content can vary significantly from service to service and over time. Each service may vary in presentation technique. For example, some services use HTML frames and others do not. Results can vary from day to day as new functionality is added to each service. For example, a document retrieved with three active links may have more (or fewer) active links when retrieved in the future.

Additionally, the content for a specific citation can change over time. For specific citations, most services will return the most current version of a document rather than an older version. For this reason, a cite retrieved for an older hyperlink can return a newer version of the document if the same link is run in the future. Similarly, the same search completed through a given hyperlink can provide time variant results because more documents may meet its encapsulated search criteria.

Because of the persistent nature of URLs, the use of any authentication, or user-specific information in the URL is avoided in the exemplary embodiment. While it is likely that the content addressed by this proposal will be protected and the user will need to present authentication information, the prompting for this remains outside of the actual URL syntax in the exemplary embodiment. Users, however, can share URLs without allowing others access to their data access account.

One potential use of the invention would be when publishers may want to allow other users access to their account in the form of sponsored links. The third party publisher would have an agreement with the content provider to provide a slice of content to their subscribers or even to the general Internet community. In this case, pages at the publisher's site would contain URL links that link to the content provider. These URL links would contain a sponsorship parameter ("&sp=") to identify the sponsoring publisher and any required authentication information. The use of the sponsor parameter does not preclude the use of other forms of authentication, since the various business rules are contained on the server.

In another embodiment, users can specify, through their computer systems, that a document be retrieved from a CD-ROM or that a search be executed against a CD-ROM in their local CD-ROM library during definition or execution of a hyperlink. If the requested document is unavailable, local client applications can then pass along the URL to online content provider resources or not, depending on user preferences. This embodiment requires that URLs must be able to point to CD-ROM content as well as on-line information.

One embodiment of the invention warns users when a document pointed to by a URL has experienced a change in status or validity (e.g., case overturned, court rules changed, legislation superceded). These warnings can reference other content provider products or services.

CONCLUSION

In furtherance of the art, the inventors have presented a system, method, and software that automatically locate and mark specific portions of a document and define hyperlinks including at least a portion of the marked text. An exemplary implementation of the method finds and marks legal citations; automatically defines each hyperlink to include at least a portion of a marked legal citation and a name of a common computer system; and conducting a search of one or more databases based on the portion of marked text included in the hyperlink. Another feature of the exemplary method defines the name of the common computer system in the hyperlinks based on the cost or time of executing the hyperlink.

The embodiments described above are intended only to illustrate and teach one or more ways of practicing or implementing the present invention, not to restrict its breadth or scope. The actual scope of the invention, which embraces all ways of practicing or implementing the concepts of the invention, is defined only by the following claims and their equivalents.

APPENDIX A

Exemplary Phrase Lists for Phrase Database 127g

Date phrases: Apr., April, Aug., August, Dec., December, Feb., February, Jan., January, Jul., July, Jun., June, Mar., March, May, Nov., November, Oct., October, Sep., Sept., September Explanatory phrases: abrogated, acq., acq. in results, acquiesced, acquiescing, adhered to, adhering, aff'd, aff'd after abatatement, aff'd enbanc., aff'd in part, aff'd in part and remanded in part, aff'd mem., aff'd o. b., aff'd on other grounds, aff'd on rehearing, aff'd percuriam, aff'd without op., aff'd without opinion, aff'g, affirmed, affirmed enbanc., affirmed mem., affirmed without opinion, affirming, after remand, allocatur denied, alloc. denied, amad., amended, amending, app. den., app. denied, app. dism., app. dismd., app. dismissed, appeal after remand, appeal allowed, appeal den., appeal denied, appeal dism., appeal dism. sub nom., appeal dismissed, appeal dismissed sub nom., appeal filed, appeal gr., appeal granted, appealing after remand, appeals dismissed sub nom., app. filed, app. gr., application den., application denied, approved, approved by, approved en banc, approving, app. withdrawn, argued, as stated in, cause dismd., cause dismissed, cause remanded, cert. den., cert. denied, cert. denied with opinion, cert. dism., cert. dismissed, cert. gr., cert. granted, cert. granted in part, cert. if den., cert. if denied, cert. if gr., certification denied, certification granted, certifying questions to, certiorari, certiorari denied, cert. quashed, cited in, clarified, concurred, concurring, conformed to, corrected, criticized by, den., denied, denied in part, den. ovo., denying app., denying cert., denying cert. to, digest op. at, disapproved, disapproved on other grounds, disc. rev. denied, disc. review denied, dism'd, dism'g, dismissed, dismissed as moot, dismissing, dismissing appeal from, enbanc., enforcement granted, enforcement denied, enforcing, error denied, error dism'd, error dismissed, error ref'd nre., extension denied, gr., granted, habeas corpus, in part, inrelevant part, judgment affirmed, judgment aff'd, judgment den., judgment denied, judgment gr., judgment granted, judgment vacated, jurisdiction accepted, later proceeding, lv. den., lv. denied, lv. dismissed, mandamus den., mandamus denied, mod., modified, modified on rehearing, modifying, mod. on other grounds, motion den., motion denied, motion dism'd, motion gr., motion ovrr., motion to certify overruled, motion to vacate den., nonacq., nre., on mem. below, on op. below, on opinion below, on other gnds., on other grounds, on reconsideration, on reh., on rehearing, on remand, on remand to, on unrelated grounds, op. combined at, opinion after remand, op. withdrawn, ordered published, order on remand, order reinstated, overruled, overruled by, overruled in part, overruled on other grounds, overruled on unrelated grounds, overruling, ovrd., ovrld., percuriam, pet. denied, pet. for cert. filed, petition den., petition for cert. filed, petition for rev. denied, petition for rev. dism., petition for rev. dismissed, pet. ref'd, postconviction proceeding, postconviction relief den., postconviction relief gr., prob. juris noted, quashed, quashing, reaff'd, reaffirmed, receded from on other grounds, reconsideration den., reconsideration denied, reconsideration gr., reconsideration granted, reh., reh. den., rehearing, rehearing denied, rehearing granted, rehearing overr., reh'd denied, reh'g, reh'g denied, reh'g granted, reh. granted, reinstated, remanded, rem'd, reported in full, rev. allowed, rev'd, rev. den., rev. denied, rev'd in part, rev'd on other grounds, rev'd percuriam, rev'd sub nom., reversed, reversed on other grounds, reversed percuriam, reversing, rev'g, rev. granted, review den., review denied, review dismd., reviewed, review granted, reviewing, review pending, rev. on other grounds, rvd., set aside, stay allowed, stay den., stay gr., stay vac., subnom., substitute dop., summary op. at, superseded, supplemental of, supp. op., trans. denied, transfer denied, vacated, vacated as moot, vacated in part, vacated on other grounds, vacating, withdrawing, withdrawn, without op., writ den., writ denied, writ denied percuriam, writ dismd., writ granted, writ ref'd, writ refused Extension phrases: @, @@, act, acts, amend, amendments, amends, amended, apps., art., article, articles, arts., at, at p., at page, at pages, at pp., c., canon., canons., cc, ch., chap., chaps., chapt., chapter, chapters, chapts., chs., cl., clause, clauses, cls., div., division, divisions, divs., fn., item, n., nn., no., nos., note, p., page, pages, para., paragraph, paragraphs, paras., pars., part, pg., pgs., pp., pt., pts., rule, rules, s., sec., secs., sect., section, sections, ss., suba., subart., subarticle, subarticles, subarts., subc., subch., subchap., subchapt., subchapter, subchapters, subd., subdiv., subdivision, subdivs., subds., subp., subpar., subpara., subparagraph, subparagraphs, subparas., subpart, subparts, subpt., subs., subsec., subsecs., subsect., subsection, subsections, subsects., subt., subtit., subtitle, subtitles, supp., suppl., supplement, supplements, supra, t., ti., tit., title, titles, tits., vol., vols., volume, volumes, °, °°

Invalid caselaw phrases: en banc, in banc, mem., memorandum, per curiam, unpublished versus phrases: v., versus, vs.

Multi-word Title phrases: and the, at the, ex rel, for a, for the, in the, of the, on the Editor phrases: BLACK, BNA, CCH, CRANCH, DALL, HOW, MET, PET, PH, WHEAT Extension phrases: @, @@, act, acts, amend, amendments, amends, amended, apps., art., article, articles, arts., at, at p., at page, at pages, at pp., c., canon., canons., cc, ch., chap., chaps., chapt., chapter, chapters, chapts., chs., cl., clause, clauses, cls., div., division, divisions, divs., fn., item, n., nn., no., nos., note, p., page, pages, para., paragraph, paragraphs, paras., pars., part, pg., pgs., pp., pt., pts., rule, rules, s., sec., secs., sect., section, sections, ss., suba., subart., subarticle, subarticles, subarts., subc., subch., subchap., subchapt., subchapter, subchapters, subd., subdiv., subdivision, subdivs., subds., subp., subpar., subpara., subparagraph, subparagraphs, subparas., subpart, subparts, subpt., subs., subsec., subsecs., subsect., subsection, subsections, subsects., subt., subtit., subtitle, subtitles, supp., suppl., supplement, supplements, supra, t., ti., tit., title, titles, tits., vol., vols., volume, volumes, °, °°

Idnt phrases: act, and, as, in, of, see, see also, to, under

In re phrases: estate of, guardianship of, in re, matter of, will of

Invalid caselaw phrases: NO, NO., No, No., Sec, Sec., arm, at, ch, col, col., d, in, no, no., or, p, p., pars, sec, ss Invalid statute phrases: As, as, Cost, cost, hrs, hrs., in, Last, last, Most, most, Past, past Explanatory phrases: accord, according, according to, accordingly, also, also see, and see, appeal of, application of, article, as, but see, cf., cite, cite as, citing, comment, compare, compare with, contra, decided, duties under, eg., enforced, enforcing, finally, generally, however, ibid, id, ii, iii, in, more over, note, principle of, principles of, pursuant to, quoted in, quoting, reliance on, reported at, rule, see, see also, see eg., see generally, similarly, specifically, supra, the, thus, under Key word phrases for statutes: @, @@, act, acts, amend, amendments, amends, amended, and, apps., art., article, articles, arts., as, c., canon., canons., cc, ch., chap., chaps., chapt., chapter, chapters, chapts., chs., cl., clause, clauses, cls., div., division, divisions, divs., in, McKinney, McKinney's, no., nos., number, numbers, N.Y. McKinney's, of, order no., p., page, pages, para., paragraph, paragraphs, paras., pars., part, pg., pgs., pp., pt., pts., rule, rules, s., sec., secs., sect., section, sections, ss., suba., subart., subarticle, subarticles, subarts., subc., subch., subchap., subchapt., subchapter, subchapters, subd., subdiv., subdivision, subdivs., subds., subp., subpar., subpara., subparagraph, subparagraphs, subparas., subpart, subparts, subpt., subs., subsec., subsecs., subsect., subsection, subsections, subsects., subt., subtit., subtitle, subtitles, supp., suppl., supplement, supplements, supra, t., through, thru, ti., tit., title, titles, tits., to, under, vol., vols., volume, volumes, °, °° othcphr.dat: citing, emphasis added, quoting

Title word phrases: a, as, and, for, mm, of, on, or, re, rel, supra, the, to, with

APPENDIX B

Exemplary Boolean Query System

| Connector | Character Codes | Retrieves |
| --- | --- | --- |
| AND | & | Search terms in the same document: narcotics & warrant |

-continued

| Connector | Character Codes | Retrieves |
| --- | --- | --- |
| OR | Space | Either search term or both: car automobile |
| Grammatical Connectors | /p | Search terms in the same paragraph: hearsay /p utterance |
| | /s | Search terms in the same sentence: design*** /s defect! |
| | +s | The first term preceding the second within the same sentence: palsgraf +s island |
| | +p | The first term preceding the second within the same paragraph: ti(mikkelson +p mikkelson) |
| Numerical Connectors | /n | Search terms within "n" terms of each other (where "n" is a number): person**/3 jurisdiction |
| | +n | The first term preceding the second by "n" terms (where "n" is a number): 20 + 51080 |
| Phrase | " " | Search terms appearing in the same order as in the quotation marks: "attractive nuisance" |
| Excluding terms | % (but not) | Documents not containing the term or terms following the % symbol: laminectomy % to(413) |

The invention claimed is:

1. A computer-implemented method for automatically inserting hyperlinks into an active document, the method comprising:
 locating and marking automatically one or more legal citations, in the active document within a document-processing application;
 automatically defining a hyperlink at each location in the active document where the one or more legal citations are found, wherein each hyperlink has a uniform resource locator (URL) including at least a portion of the marked legal citation as a search term and a domain name associated with an online legal research service; and
 implementing a search based on the included portion of the marked legal citation, using the URL, in response to selection of the hyperlink;
 wherein the hyperlink does not include a specific document address.

2. The method of claim 1, wherein the document-processing application includes at least one of a word-processing application, a spread-sheet application, and a presentation-development application.

3. The method of claim 1, wherein the document-processing application includes a version of Microsoft Word or Corel WordPerfect.

4. The method of claim 1, wherein one or more of the hyperlinks further includes account information for a user.

5. The method of claim 1, wherein one or more of the hyperlinks further includes information identifying a third-party sponsor for facilitating access to documents in a database accessible by selecting the hyperlink.

6. The method of claim 1, wherein one or more of the hyperlinks include at least one query connector.

7. The method of claim 1, wherein one or more of the hyperlinks further includes at least one search instruction.

8. The method of claim 1, wherein the hyperlink identifies one of a natural-language search method and a boolean search method.

* * * * *